Figure 1:
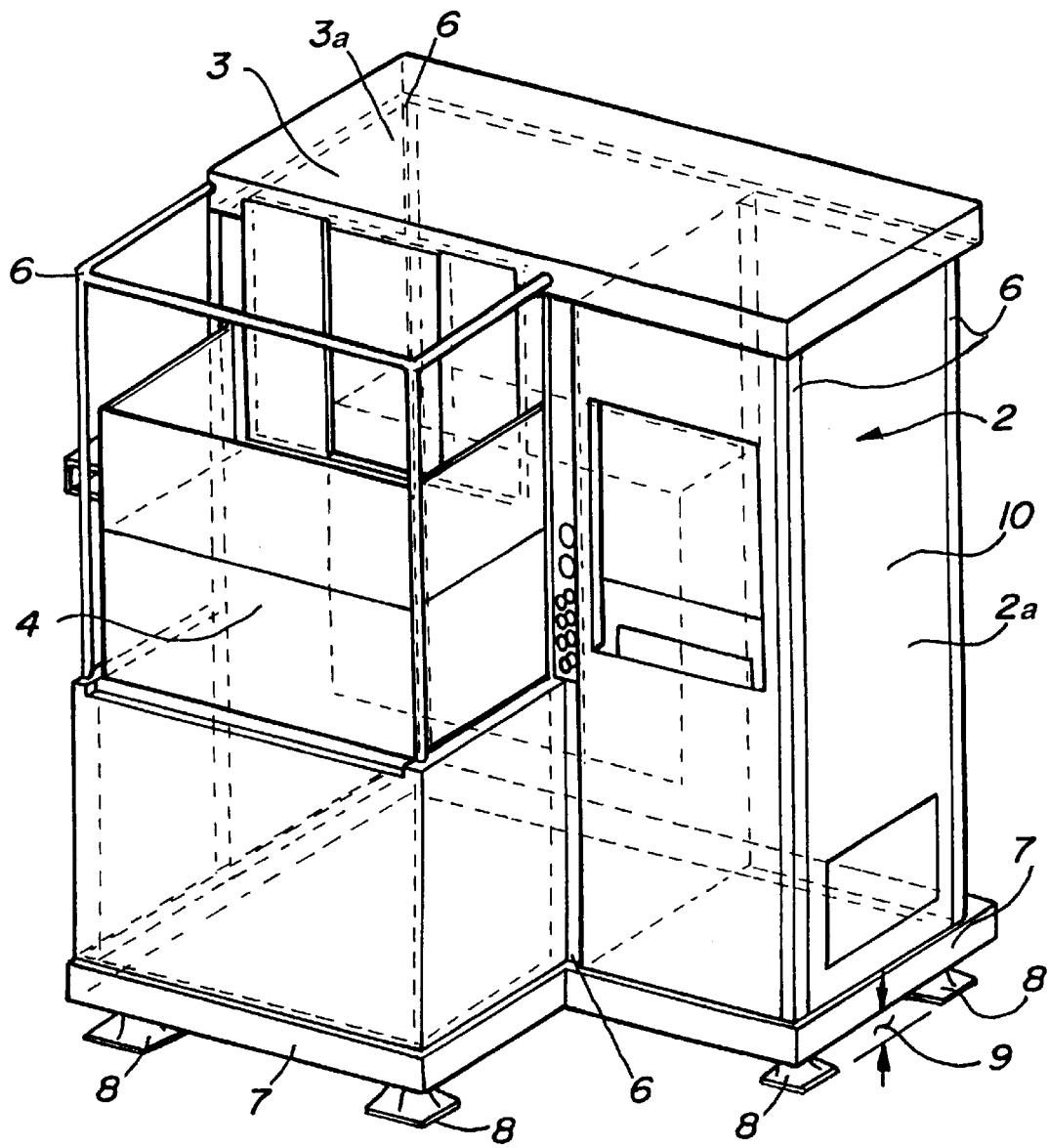

United States Patent
Berger et al.

[11] Patent Number: 5,808,261
[45] Date of Patent: Sep. 15, 1998

[54] ELECTRICAL DISCHARGE MACHINE

[75] Inventors: Hansruedi Berger, Fuerthalen; Marcel Bouchoud, Geneva, both of Switzerland

[73] Assignee: Charmilles Technologies S.A., Switzerland

[21] Appl. No.: 644,324

[22] Filed: May 10, 1996

[30] Foreign Application Priority Data

May 12, 1995 [CH] Switzerland .......................... 01381/95

[51] Int. Cl.⁶ .............................. B23H 1/00; B23H 11/00
[52] U.S. Cl. ........................................................ 219/69.11
[58] Field of Search ........................... 219/69.11, 69.14, 219/69.2, 69.19, 69.12

[56] References Cited

U.S. PATENT DOCUMENTS

| | | | |
|---|---|---|---|
| 3,092,710 | 6/1963 | Kiriltsev et al. | 219/69.2 |
| 4,755,651 | 7/1988 | Tsutsui et al. | 219/69.14 |
| 5,078,234 | 1/1992 | Lin | 219/69.14 |
| 5,264,676 | 11/1993 | Kanaya et al. | 219/69.11 |
| 5,410,119 | 4/1995 | Lehmann | 219/69.12 |
| 5,506,380 | 4/1996 | Lodetti | 219/69.11 |

FOREIGN PATENT DOCUMENTS

| | | | |
|---|---|---|---|
| 59-81019 | 5/1984 | Japan | 219/69.11 |
| 60-167722 | 8/1985 | Japan | 219/69.11 |
| 63-306836 | 12/1988 | Japan | 219/69.19 |

*Primary Examiner*—Geoffrey S. Evans
*Attorney, Agent, or Firm*—Gifford, Krass, Groh, Sprinkle, Patmore, Anderson & Citkowski, P.C.

[57] ABSTRACT

An electrical discharge machine with a machine is shown bed, a work tank filled with a dielectric fluid and vertically adjustable in which a work table is arranged, a generator and a control unit. All units of the machine are surrounded by a metal structure. Additional units can be integrated into the metal structure.

12 Claims, 4 Drawing Sheets

ELECTRICAL DISCHARGE MACHINE

The invention pertains to an electrical discharge machine with a machine bed, a work tank filled with a dielectric fluid and vertically adjustable in which a work table is arranged, a generator and a control unit.

In electrical discharge machining, a material removal process takes place because of electrical discharge between two electrodes. The electrodes are made of conductive materials, which are brought toward one another in a nonconductive fluid. An applied voltage provokes a discharge at a sufficiently small spacing of the electrodes. The electrical energy is converted directly at the point of impact into thermal energy for material removal. Discharge occurs discretely over time at a high frequency.

Electrical discharge machines consist of a machine bed, a work tank filled with a dielectric fluid, a work table located in it, as well as a generator and a control unit. The generator and control unit are housed in a switch box, which is connected to the remainder of the machine via supply lines. A large setup space is required for this and an installation is necessary for connecting the machine to the switch box. During machining, the electrode holder or the tool table extend outside of the basic dimensions of the machine.

The workpieces are clamped to a work table. The work table is located in a work tank that is filled with the dielectric [fluid]. The tank is emptied during each workpiece change and refilled after the clamping [of the new workpiece]. Since the workpiece and the electrode must be submerged in this dielectric to a certain minimum extent and workpieces of varying sizes are machined on a single machine, the volume of the work tank is designed for large workpieces. The disadvantage in this regard is that, for smaller workpieces, the amount of fluid in the work tank is excessive. The time required for filling and emptying is too long for small workpieces.

An electrical discharge machine is disclosed in DE 3,303,758. In this electrical discharge machine, a work tank that can be lowered vertically is disclosed. This arrangement of the work tank has the benefit of a compact construction. The disadvantageous aspect of this machine is that the switch box is arranged separately. A rapid installation of the machine at the point of use is not possible.

The problem of the invention is to create a discharge machine that is designed compactly and with which efficient machining can be done.

This problem is solved in that all units of the machine are surrounded by a metal structure that consists of individual supports.

A metal structure is arranged around the electrical discharge machine. This structure consists of individual metal supports or metal bars that are mutually connected and exhibit the effect of a Faraday cage. The electromagnetic radiation of the machine is shielded in this way. By using such a framework, it is possible to design the machine to be compact. The machine, dielectric and generator are arranged in this framework. If the base is constructed of strong supports, the whole machine can be transferred, for instance, on a forklift. Besides, the compact construction results in the advantage that the machine can be quickly and rapidly installed at the operating site. Additional apparatuses, such as a fire-extinguishing unit or an electrode-changing unit, can be housed in this metal structure.

The workpiece is clamped to the work table, which is immovably connected to the machine bed. In a cavity-sinking EDM machine, for instance, the electrode is arranged on an electrode holder, with the electrode holder being adjustable in the horizontal plane. This allows a very stable construction with a large displacement path for the electrode. The stationary work table makes the clamping of larger workpieces with relatively high weight easier or possible in the first place.

The work table is located in a work tank that is filled with a nonconductive fluid, such as distilled water or kerosene. The work tank is vertically adjustable with respect to the work table, i.e., the volume is variable. This has the advantage that the amount of fluid appropriate to a certain workpiece can be metered into the work tank. This means that, for example, a smaller amount of fluid is present during machining for smaller workpieces than for larger ones. The advantage lies in the fact that only the actually required amount of fluid is made available in the work tank and the filling time is reduced thereby to a minimum.

When a change of workpieces occurs, the fluid must first be drained. This is done by depressurizing a pressure-loaded tubular gasket running circumferentially around the work tank and the fluid then flows out quite quickly into a storage container. The fluid can be drained off considerably faster with this process, compared to conventional drain openings.

The work tank is now lowered; workpieces can be comfortably arranged on the work table.

Due to this configuration of the work tank and the metal structure, a vertically movable viewing shield can be arranged around the work tank. It can be put into the operating position quickly and manually by means of counterweights.

If kerosene is used, the dielectric fluid present in the work tank is flammable. In order to reduce the hazard to persons and the environment, a fire-extinguishing system is integrated into the electrical discharge forming machine. A fire that has broken out is reported by a fire alarm to a control unit and the control unit opens a container filled with an extinguishing agent with the extinguishing agent being fed by lines to nozzles and the fire is extinguished in this manner.

Additional advantageous configurations of the invention are described in the description of the figures below.

These show in

Figure 2:
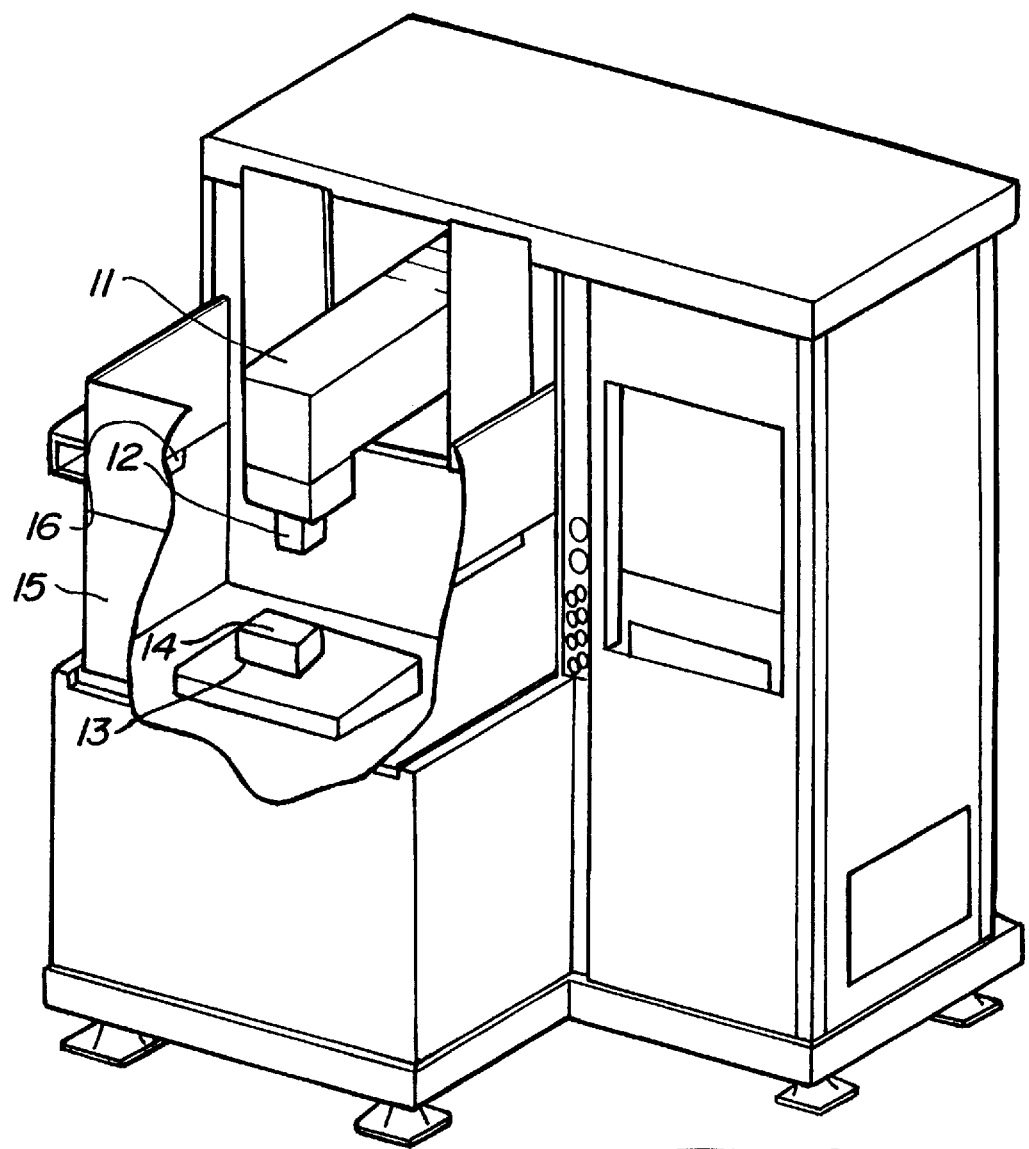
Figure 3:
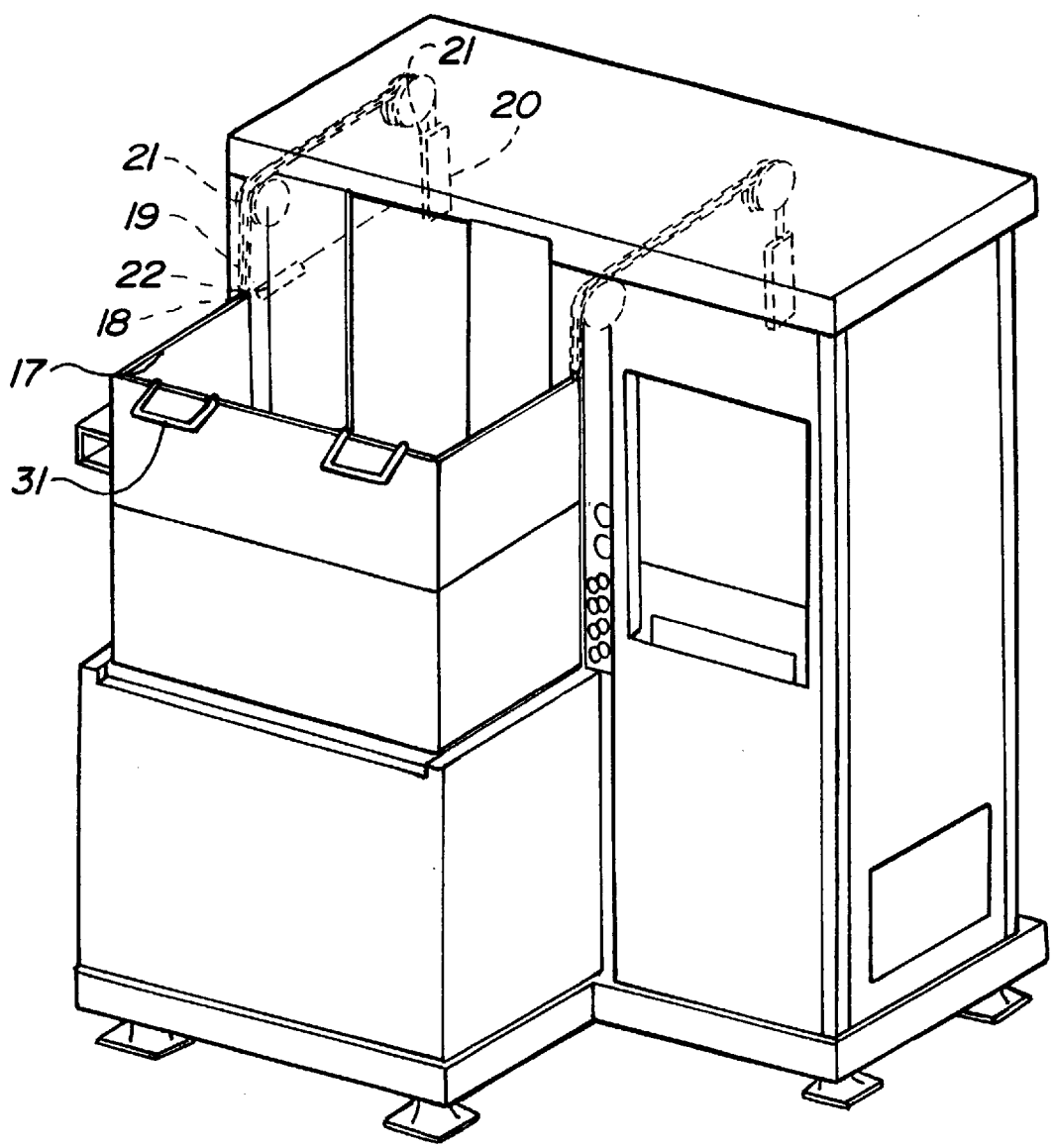
Figure 4:
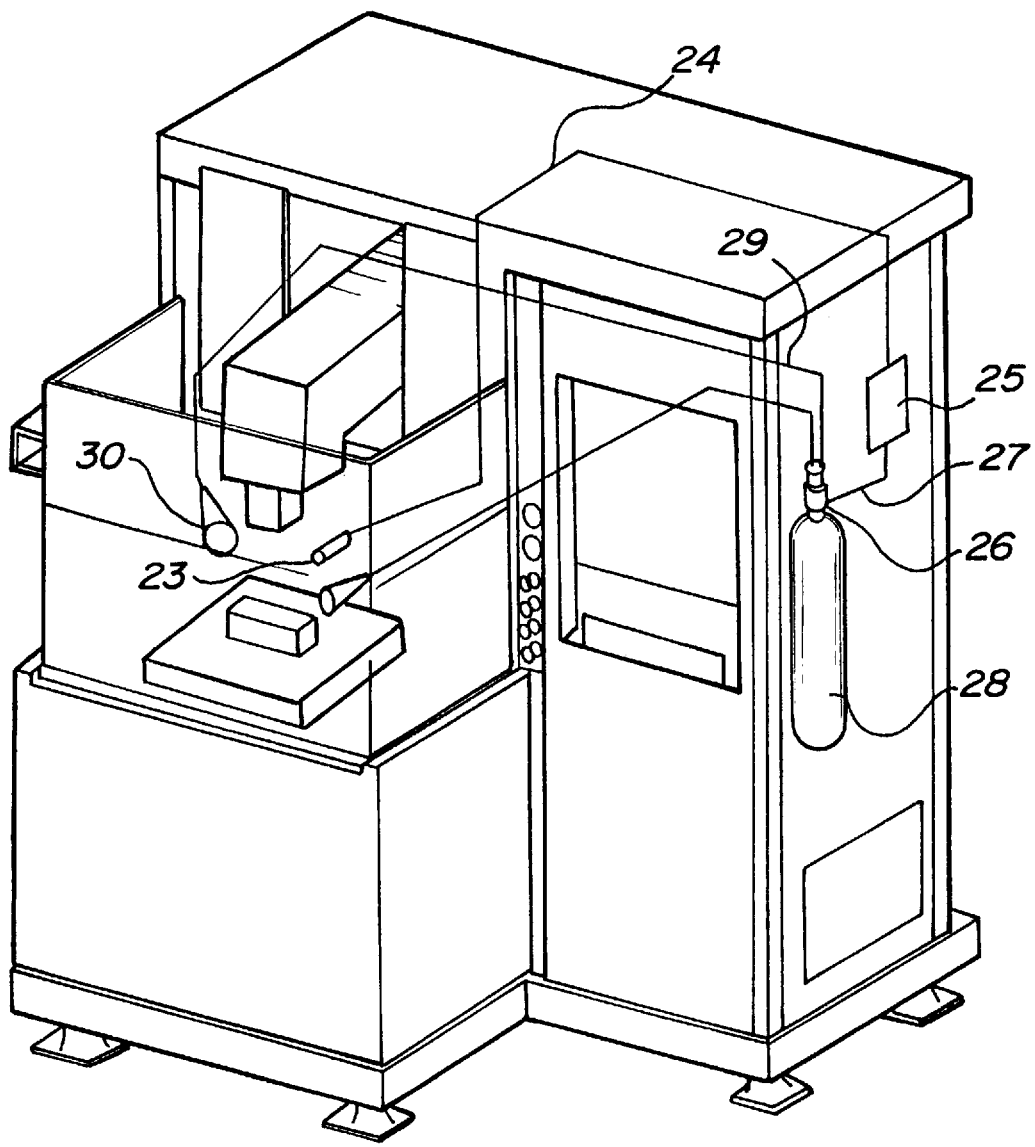

FIG. 1, a perspective view of a cavity-sinking EDM machine;

FIG. 2, the same view as in FIG. 1 with toolholder and work table;

FIG. 3, the same view as in FIG. 1 with a viewing shield shown in further detail; and FIG. 4, a schematic representation of an integrated fire-extinguishing unit.

FIG. 1 shows a cavity-sinking EDM machine in simplified form. The cavity-sinking EDM machine consists mainly of the control unit 2, the machine area 3 and the work area 4. The machine area 3 consists essentially of a machine bed and an electrode holder arranged on it; the work area 4 consists of a work tank and a work table, and a generator is integrated in the control unit 2 in the present example. All areas are joined into a unit. This unit consists of a metallic metal [sic] structure that is formed from individual supports 6. A base 7 formed of very stable supports is arranged at the bottom of the metal structure. Support feet 8 are arranged under the base 7. Between the floor and the machine, this results in an air gap 9, into which the holding devices of a forklift can be inserted. The support feet can be adjusted in height by means of a height adjustment, in order to compensate for unevenness of the floor. The machine can thus be quickly and easily oriented horizontally. The individual supports are solidly connected together. The arrangement can be done arbitrarily. For instance, the supports could be constructed so that they can be folded and moved around the work area. There also exists the possibility of omitting these supports. Covers 10 are arranged between the supports 6. Where necessary, at the work area or at maintenance points, for instance, foldable or movable covers are provided.

The work area 4 is shown in greater detail in FIG. 2. An adjustable holder device 11 on which the electrode 12 is arranged extends from the machine area 3 into the work area 4. Below it, the work table 13, on which a workpiece 14 can be clamped, is arranged. The work table 13 is surrounded by a work tank 15 that is filled with a dielectric fluid. This work tank 15 can be adjusted in height with respect to the machine area. In height adjustment, the three outer tank walls are displaced vertically. Sealing is done by means of a pressure-loaded tubular gasket which is laid along the sealing point.

Overflow openings 16 that determine the fill level of the work tank are arranged at the upper rim of the work tank. The work tank is brought into a defined position depending on the size of the workpiece. For this purpose the data of the workpiece is transferred to the control unit and the height adjustment is activated with this data.

No drain opening is provided with this machine. In order to empty the work tank, the tubular gasket is simply depressurized; the fluid quickly runs along the sealing joint into a catch basin and is returned to the fluid circulation system.

As can be seen from FIG. 3, a viewing shield 17 is arranged around the work tank and is movable into and out of a work position. It can likewise be displaced vertically. At the upper edge 18 facing the machine area, tension means in the form of chain segments 19 are solidly connected. Counterweights 20 are arranged at the other end of the chain segments 19. The chain segments 19 are guided over two reversing toothed wheels 21. The displacement is accomplished manually by means of two handgrips 31. It is also possible to provide a drive mechanism. This could be done, for instance, by connecting a motor to the reversing toothed wheels 21. The [occupation of the] work position is reported to the control unit by a sensor 22. This signal releases machining. The viewing shield 17 may be lowered below the work table.

FIG. 4 shows a fire-extinguishing system integrated into the machine. A smoke alarm 23 is arranged above the work table 13 and connected to a computer element 25 via a line 24. In case of a fire, this computer element 25 actuates an opening valve 26, which is connected to the computer element 25 via a line 27. The opening valve 26 is motively connected to a fire extinguisher 28. If the fire extinguisher 28 is opened by the opening valve 26, the extinguishing agent in the fire extinguisher 28 flows out via the lines 29 to two funnel-shaped nozzles 30. The funnel-shaped nozzles 30 are oriented such that the extinguishing agent flows straight toward the work area.

What is claimed is:

1. Electrical discharge machine with a machine bed, a work tank filled with a dielectric fluid, said work tank being vertically adjustable with respect to said machine bed, a work table disposed within the work tank, a generator and a control unit, characterized in that said machine bed, said work tank, said generator and said control unit of said machine are surrounded by a metal enclosure, said enclosure comprising a base and a plurality of metal supports extending vertically upwardly from said base to form the corners of said enclosure and being connected to form a Faraday cage to shield the electromagnetic radiation of the machine.

2. Electrical discharge machine according to claim 1, characterized in that said base comprises metal supports having a higher strength than said vertically extending supports and which a plurality of height-adjustable feet are arranged on the side of said base opposite said vertically extending supports.

3. The electrical discharge forming machine according to claim 1 and in which said enclosure further comprises covers mounted to said vertically extending support members.

4. Electrical discharge machine according to claim 1, characterized in that the work tank can be adjusted to a level appropriate for the respective workpiece to be machined, in order to obtain an optimal filling amount within the work tank.

5. Electrical discharge machine according to claim 1, characterized in that the work tank has at least one overflow opening at its upper rim which determines the fill level of the work tank.

6. Electrical discharge machine according to claim 1, characterized in that a fluid outlet opening is provided comprising a pressure-loaded tubular gasket at the sealing point of the work tank opposite the machine bed and is depressurized for draining.

7. Electrical discharge machine according to claim 1, characterized in that the outflowing fluid can be caught in a catch basin arranged underneath the work table and returned from the catch basin to the fluid circulating system.

8. Electrical discharge machine according to claim 1, characterized in that a viewing shield, which can be displaced relative to the work table, is arranged around the work tank to a work position.

9. Electrical discharge machine according to claim 8, characterized in that the viewing shield can be moved manually under the force of counterweights or automatically by a motor.

10. Electrical discharge machine according to claim 1, characterized in that the work position of the viewing shield can be detected by a sensor and the sensor passes a signal on to the control unit upon the achievement of the work position.

11. Electrical discharge machine according to claim 1, characterized in that an automatically controllable fire-extinguishing system is disposed within said metal enclosure.

12. In a structure for enclosing an electrical discharge machine having a work tank configured to contain a dielectric fluid, a work table disposed within the work tank, a generator and a control unit, the improvement comprising:

a plurality of metal supports removably attached to each other;

a metal base and said supports removably attached to said base and with a number of said supports extending upwardly from the base; and at least one cover removably attached to at least one of the supports whereby the structure may be disassembled, relocated and reassembled;

said metal supports and said base being connected together to form a Faraday shield enclosing said work tank, said generator and said control unit.

* * * * *

UNITED STATES PATENT AND TRADEMARK OFFICE
CERTIFICATE OF CORRECTION

PATENT NO. : 5,808,261

DATED : 9/15/98

INVENTOR(S) : Berger et al.

It is certified that error appears in the above-identified patent and that said Letters Patent is hereby corrected as shown below:

Column 2, line 44, after "as in figure 1 with" insert --the viewing shield shown partially cutaway to display the--.

Column 2, line 53, after "bed" insert --3a--.

Column 2, line 55, after "generator" insert --2a--.

Signed and Sealed this

Twenty-third Day of February, 1999

Attest:

Q. TODD DICKINSON

Attesting Officer

Acting Commissioner of Patents and Trademarks